US012762971B2

(12) United States Patent
Thür et al.

(10) Patent No.: US 12,762,971 B2
(45) Date of Patent: Oct. 13, 2026

(54) REPERTOIRE

(71) Applicant: Yousician Oy, Helsinki (FI)

(72) Inventors: Christoph Thür, Helsinki (FI); Alicja Juntunen, Helsinki (FI); Andrey Shmitko, Espoo (FI); Matti Pesonen, Helsinki (FI); Jarmo Hiipakka, Espoo (FI)

(73) Assignee: Yousician Oy Oy, Helsinki (FI)

( * ) Notice: Subject to any disclaimer, the term of this patent is extended or adjusted under 35 U.S.C. 154(b) by 214 days.

(21) Appl. No.: 18/478,036

(22) Filed: Sep. 29, 2023

(65) Prior Publication Data

US 2024/0112593 A1 Apr. 4, 2024

(30) Foreign Application Priority Data

Sep. 30, 2022 (FI) ..................................... 20225867

(51) Int. Cl.
*G09B 15/00* (2006.01)
*G10H 1/00* (2006.01)
*G09B 5/06* (2006.01)

(52) U.S. Cl.
CPC ........... *G09B 15/00* (2013.01); *G10H 1/0008* (2013.01); *G09B 5/06* (2013.01); *G10H 2210/091* (2013.01)

(58) Field of Classification Search
CPC ........ G09B 15/00; G09B 15/02; G09B 15/04; G09B 5/06; G10H 1/00; G10H 1/36; G10H 1/0008; G10H 2210/091; G10H 2210/036; G10H 2210/151; G04B 13/00
See application file for complete search history.

(56) References Cited

U.S. PATENT DOCUMENTS 4,924,745 A 5/1990 Kimpara et al.
5,021,878 A 6/1991 Lang
5,062,097 A 10/1991 Kumaoka
5,138,928 A 8/1992 Nakajima et al.
6,211,451 B1 4/2001 Tohgi et al.
6,287,124 B1 9/2001 Yamaura et al.
8,425,331 B2 * 4/2013 Bortnik ................ A63F 13/335 463/43

(Continued)

FOREIGN PATENT DOCUMENTS

EP 0837436 A1 4/1998
EP 3236449 A1 10/2017

(Continued)

OTHER PUBLICATIONS

Cox, Jeremy. Curriculum Design and Development in Higher Music Education. Handbook. AEC Publications 2007.

(Continued)

*Primary Examiner* — Grant Moubry
(74) *Attorney, Agent, or Firm* — Espatent Oy

(57) ABSTRACT

A method in an apparatus, the method comprising maintaining a repertoire of musical pieces at a user profile; receiving a user performance of a musical piece; analyzing the user performance of the musical piece; determining based on analyzing the performance whether the user performance of the musical piece fulfills at least one predetermined criterion; and based on the user performance of the musical piece fulfilling the at least one predetermined criterion, storing the musical piece into the repertoire.

19 Claims, 8 Drawing Sheets

(56) References Cited

U.S. PATENT DOCUMENTS

| | | | | |
|---|---|---|---|---|
| 8,465,366 | B2 * | 6/2013 | Applewhite | A63F 13/215 463/43 |
| 8,835,736 | B2 * | 9/2014 | Parks | A63F 13/44 84/484 |
| 9,767,705 | B1 | 9/2017 | Klapuri et al. | |
| 9,839,852 | B2 | 12/2017 | Epstein | |
| 9,847,078 | B2 * | 12/2017 | Nayak | H04L 65/1089 |
| 10,235,898 | B1 | 3/2019 | Ryynänen et al. | |
| 10,810,901 | B2 * | 10/2020 | Yan | G10C 3/26 |
| 11,145,283 | B2 * | 10/2021 | Goren | G06N 7/01 |
| 11,670,188 | B2 * | 6/2023 | Aharonson | G09B 15/00 84/477 R |
| 2003/0100965 | A1 * | 5/2003 | Sitrick | G10G 1/00 700/83 |
| 2006/0166174 | A1 | 7/2006 | Rowe et al. | |
| 2006/0196343 | A1 | 9/2006 | Yung | |
| 2008/0271591 | A1 | 11/2008 | Lemons | |
| 2010/0137049 | A1 | 6/2010 | Epstein | |
| 2010/0300269 | A1 * | 12/2010 | Applewhite | G10H 1/0058 84/610 |
| 2011/0003638 | A1 | 1/2011 | Lee et al. | |
| 2011/0283866 | A1 | 11/2011 | Hogan | |
| 2012/0295679 | A1 | 11/2012 | Izkovsky et al. | |
| 2013/0081531 | A1 | 4/2013 | Minamitaka | |
| 2013/0205975 | A1 | 8/2013 | Williams | |
| 2014/0041511 | A1 | 2/2014 | Kaipainen et al. | |
| 2014/0076123 | A1 | 3/2014 | Tanaka | |
| 2014/0352520 | A1 | 12/2014 | Citron et al. | |
| 2015/0094144 | A1 | 4/2015 | Brown et al. | |
| 2016/0253915 | A1 | 9/2016 | Lee et al. | |
| 2017/0046971 | A1 | 2/2017 | Moreno | |
| 2017/0221377 | A1 | 8/2017 | Uemura et al. | |
| 2018/0268727 | A1 | 9/2018 | Dohring et al. | |
| 2020/0051460 | A1 | 2/2020 | Bedor et al. | |
| 2022/0172638 | A1 | 6/2022 | Aharonson et al. | |
| 2022/0172640 | A1 | 6/2022 | Aharonson et al. | |
| 2022/0180767 | A1 | 6/2022 | Aharonson et al. | |
| 2022/0310047 | A1 | 9/2022 | Klapuri et al. | |
| 2023/0245586 | A1 | 8/2023 | Livne et al. | |
| 2023/0245636 | A1 | 8/2023 | Dobo et al. | |
| 2023/0377540 | A1 | 11/2023 | Gover et al. | |
| 2023/0386155 | A1 | 11/2023 | Aharonson et al. | |

FOREIGN PATENT DOCUMENTS

| | | | |
|---|---|---|---|
| WO | 2011002731 | A2 | 1/2011 |
| WO | 2012146829 | A1 | 11/2012 |

OTHER PUBLICATIONS

Abramo, Joseph. Developing Core Practices for an Instrumental Music Education Methods Course. In: Visions of Research in Music Education, vol. 27, 2016. pp. 1-26. ISSN: 1968-2065. https://opencommons.uconn.edu/vrme/vol27/iss1/2.

Payne, Phillip D. et al. An Emerging Process of Assessment in Music Education. In: Music Educators Journal, Mar. 2019, pp. 36-44. DOI: 10.1177/0027432118818880. http://journals.sagepub.com/home/mej.

Chew, Carol: The Creation of an Expert System for Teaching Piano Lessons, Masters Thesis, University of Central Florida, Stars, 1987, pp. 1-103.

The Midi Association. The History of MIDI Collection (retrieved from https://midi.org/the-history-of-midi on Feb. 3, 2026).

* cited by examiner

REPERTOIRE

RELATED APPLICATIONS

This application relates to U.S. Pat. No. 9,767,705 B1, titled SYSTEM FOR ESTIMATING USER'S SKILL IN PLAYING A MUSIC INSTRUMENT AND DETERMINING VIRTUAL EXERCISES THEREOF, granted on 2017 Sep. 19, which is hereby incorporated by reference in its entirety.

TECHNICAL FIELD

The present disclosure generally relates to learning music. In particular, but not exclusively, the present disclosure relates to creating and maintaining a personal repertoire of music.

BACKGROUND

This section illustrates useful background information without admission of any technique described herein representative of the state of the art.

Currently, in most of the music learning and playing services today, it is not easy for the user to keep track of the musical pieces that they already know and can play fluently. Typically, feedback is presented after a performance of a musical piece, for example an overall score, and the user would at that point see how well the performance succeeded.

Previously known music learning services provide for analyzing a user performance of a musical piece. Such a system is known e.g. from U.S. Pat. No. 9,767,705 B1. Furthermore, storing achievements of a user in a musical game is known from U.S. Pat. No. 9,839,852 B2.

Learning to play a musical instrument is however not always merely an issue of improving technical skills and being able to play a musical piece once. That is, while learning music, the users often return to play same musical pieces, they might forget some musical pieces entirely and their taste in different genres or types of songs may change and vary greatly. Mastering a song is also a rewarding moment and adds to the motivation of the user.

Accordingly, there is a need for a system in which the users have an overview of musical pieces they have mastered and in which the mastered musical pieces are kept up to date.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

In a first example aspect, there is provided a method in an apparatus, the method comprising

- maintaining a repertoire of musical pieces at a user profile;
- receiving a user performance of a musical piece;
- analyzing the user performance of the musical piece;
- determining based on analyzing the performance whether the user performance of the musical piece fulfills at least one predetermined criterion; and
- based on the user performance of the musical piece fulfilling the at least one predetermined criterion, storing the musical piece into the repertoire.

The method may further comprise determining whether the musical piece performed is prior to receiving the user performance a part of the repertoire.

The method may further comprise providing feedback to the user based on analyzing the performance of the musical piece and/or based on fulfilling the at least one predetermined criterion.

The method may further comprise based on the user performance of the musical piece updating performance history of the musical piece.

The method may further comprise updating user skill level comprising skill characteristic values based on analyzing the user performance.

The method may further comprise providing feedback to the user while analyzing the user performance.

The at least one predetermined criterion may comprise a set of criteria comprising performance characteristic values corresponding to the skill characteristic values.

Maintaining the repertoire of musical pieces at a user profile may further comprise

- determining for each musical piece in the repertoire a number of past performances and/or a time elapsed from the last performance;
- determining whether the musical piece should be removed from the repertoire based on the number of past performances and/or the time elapsed from the last performance; and
- removing the musical piece from the repertoire based on the determination.

The method may further comprise presenting a notification to the user on a musical piece being in danger of being removed from the repertoire based on the time elapsed from the last performance.

Determining whether the musical piece should be removed from the repertoire based on the number of past performances and/or the time elapsed from the last performance may comprise determining that the musical piece will remain in the repertoire permanently if it fulfills a predetermined condition.

Determining whether the musical piece should be removed from the repertoire based on the number of past performances and/or the time elapsed from the last performance may comprise checking whether the musical piece has previously been in danger of being removed or has been removed from the repertoire.

Determining whether the musical piece should be removed from the repertoire based on the number of past performances and/or the time elapsed from the last performance may comprise comparing user skill level to the performance characteristic values of the musical piece.

Determining whether the user performance of the musical piece fulfills at least one predetermined criterion may comprise an automatic determination and/or a human determination.

Providing feedback to the user based on analyzing the performance of the musical piece may comprise recommending a further musical piece to the user and/or recommending a connection to a human teacher.

According to a second example aspect, there is provided an apparatus comprising at least one memory and processor collectively configured to cause the apparatus to perform the method of the first example aspect.

According to a third example aspect there is provided a non-transitory memory medium comprising a computer program, the computer program comprising computer program code configured to, when executed by an apparatus, to cause the apparatus to perform the method of the first example aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1A:
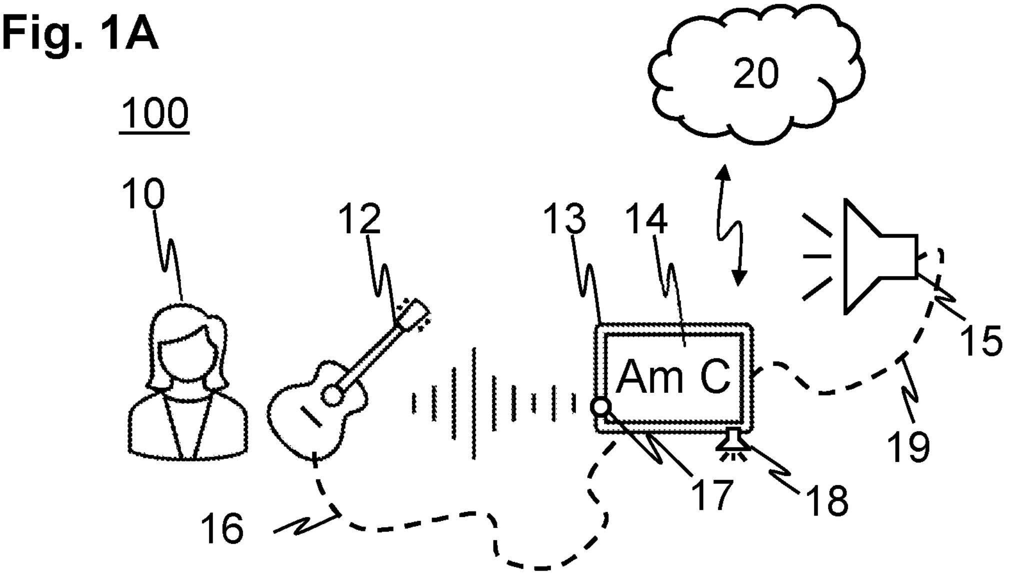
FIG. 1A schematically shows a system according to an example embodiment.

FIG. 1A schematically shows a user 10 and a system 100 according to an example embodiment. The system comprises a musical instrument 12, here a guitar and an apparatus 13 such as a tablet computer or a smartphone with a display 14. It shall also be appreciated that the apparatus 13 need not perform all processing locally. The apparatus 13 may in an embodiment operate as a terminal only acting as a man-machine interface, while processing is performed partially or entirely in a remote location, for example a remote server or a cloud-based service 20.

FIG. 1A further shows an optional electric cable 16 such as an analogue guitar cable, microphone cable, or a MIDI cable; a built-in or attachable microphone 17; a built-in or attachable loudspeaker 18; and an external loudspeaker 15 with an optional loudspeaker cable 19. In an example embodiment, system 100 comprises a plurality of microphones, e.g., one or more for each musical instrument. In an example embodiment, the system 100 comprises a plurality of loudspeakers 15, 18. The loudspeakers may be wired and/or wireless. While the system of FIG. 1A has been depicted with a musical instrument 12 comprising a guitar, the embodiments of the invention described herein are equally applicable to other musical instruments or singing.

Figure 1B:
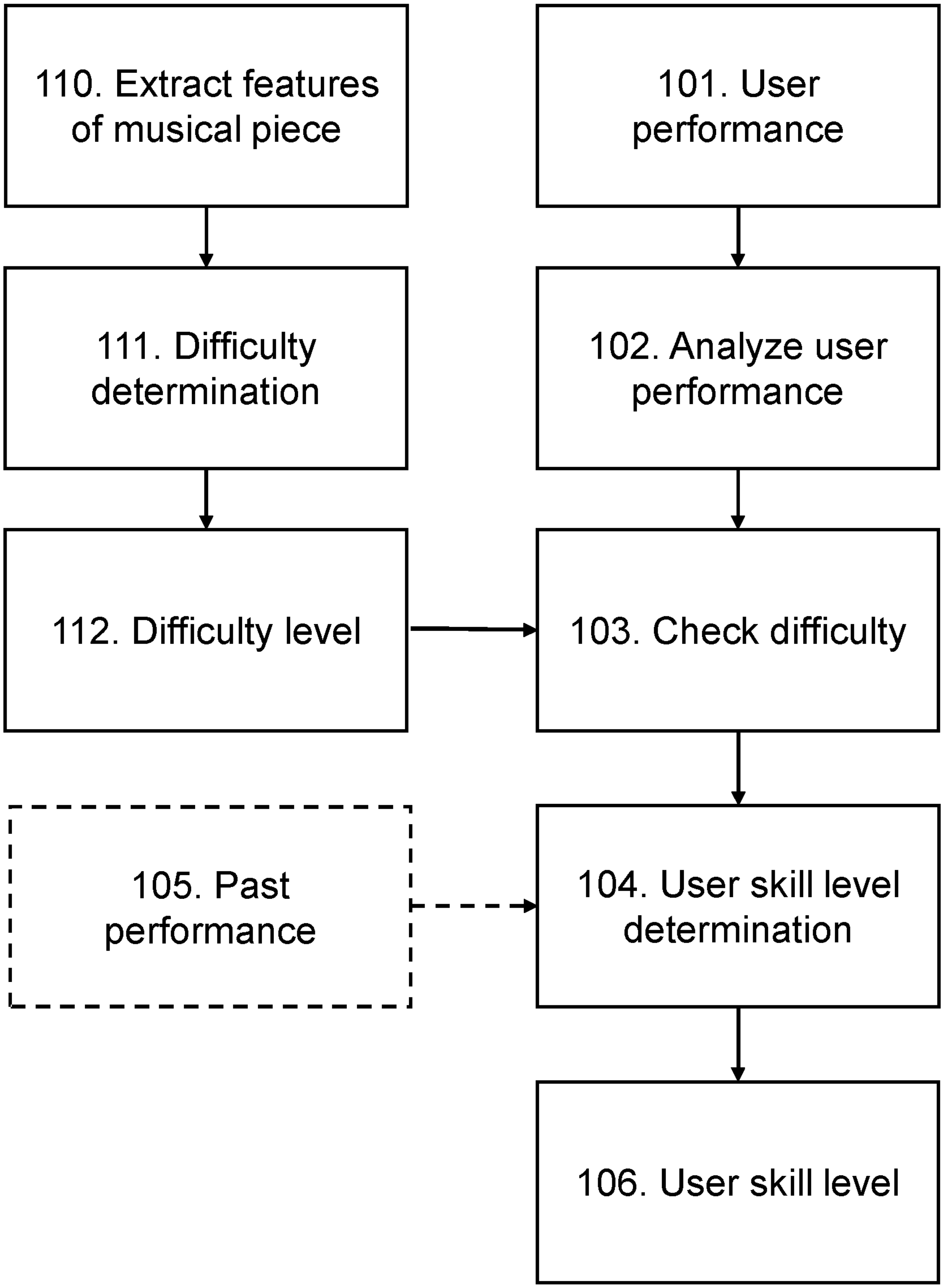
FIG. 1B shows a flow chart of a method of analyzing a performance of a musical piece and user skill level according to an example embodiment.

FIG. 1B shows a flow chart of a method of analyzing a user performance and determining a user skill level, including taking into account a difficulty level of a musical piece, according to an example embodiment. The method shown in FIG. 1B is simplified illustration of the method used in an example embodiment for analyzing the user's performance and skill characteristics known from the Yousician® U.S. Pat. No. 9,767,705 B1, in particular FIGS. 2 to 3b with the corresponding description thereof.

At 101 the user performs a musical piece. In an embodiment, the musical piece comprises a song, a variation of a song, an exercise or a skill test. In an embodiment, the user is prompted to perform the musical piece. In an example embodiment, the musical piece the user is to perform is selected and presented to the user. In a further embodiment, a selection of musical pieces is presented to the user for user selection of the musical piece to be performed.

At 102 the user performance is analyzed and compared against the target musical notation to detect any mistakes or inaccuracies in pitch content, timing, dynamics, and other factors in performing the sounds that make up the song. Also the locations of the mistakes/inaccuracies are detected: which events (notes, chords) were performed correctly or incorrectly, and what types of mistakes were made if any.

In an embodiment, the user performance may be stored as historic user performance comprising at least part of the following: The difficulty level and difficulty characteristics (constituting a difficulty profile) of a musical piece, any mistakes that the user made when performing the song, the number of times the user performed the song before this performance, and the calendar time when the performance (s) took place. The abovementioned information is in an embodiment stored in the user's performance history. Based on the performance history, in an embodiment, the user's skill level may be computed.

In an example embodiment, other users are also allowed to give feedback and grade the stored performances of other users. This allows for evaluating user performances from a human viewpoint, in comparison to an objective comparison of difficulty and skill characteristic values or performance analysis of a song. This may be also used to evaluate the quality of improvised performances where the idea is not to play the exact notes and chords of the song but to take liberties within reasonable limits. An algorithm then calculates a "crowdsourced performance evaluation" based on several user-provided evaluations. In addition to a grade that a user has given other information, such as the skill characteristics of the user providing the grade, the total amount of grades or feedback evaluations provided by the user, the content or value of grades and date and time of when the grades have been given. Said additional information or metadata is in an embodiment used by the algorithm that combines the grades given by several users, in order to give more weight to reliable evaluations. Hence, some users' feedback may be given more value than others whereas some feedback may be filtered as less- or non-relevant, such as spam or otherwise non-reliable feedback. This historic user performance data is in an embodiment further used in determining current skill level and skill characteristics.

Along with analyzing user performance, the difficulty level and/or characteristics of the musical piece performed by the user, for example of a song, is determined. In an embodiment, the difficulty level of the musical piece is previously known and accordingly does not need to be determined anew.

The difficulty of a musical piece is represented in the system by a difficulty level. In an embodiment, the difficulty level is a single scalar value (one number) that tells how difficult the song is to perform. In an embodiment, larger numbers indicate higher difficulty. Some songs/exercises are more difficult to perform (play) than others. There can be various reasons for that: the number of notes per second may be relatively high and/or the temporal placement of the notes can be rhythmically difficulty and/or the notes to be played can be musically unpredictable and/or the notes are motorically (physically) difficulty to produce on the target instrument.

In an embodiment, the difficulty level comprises more than one difficulty characteristic values (for example "5, 7, 3") that represents the difficulty of a musical piece from the viewpoint of the different aspects (characteristics) of difficulty. For example, the first characteristic value may represent "the difficulty of the song solely from the rhythmic viewpoint, ignoring all the other characteristics of difficulty". Similarly, the second characteristic value may represent the difficulty solely from the viewpoint of motoric difficulty, and so forth. There are several different difficulty characteristics and some of them are instrument specific.

Difficulty characteristic values include in an embodiment for example:

- rhythmic difficulty: how irregularly musical notes and chords are located in time, and what is the "speed" of music (the rate at which notes/chords should be played),
- motoric difficulty: how difficult it is physically to produce the musical sounds using a musical instrument. Usually mainly related to the complexity of the physical arrangement of user's fingers,
- harmonic difficulty: how complex combinations of musical notes need to be played simultaneously (as chords) or sequentially (as very unpredictable melodies),
- expressivity difficulty: does the user need to control and vary the loudness ("dynamics") and timbre ("tone color") of the musical sounds being produced. How much and how often does the user need to vary those?

The difficulty level of a musical piece, for example song, is determined by a mathematical estimation model referred herein also as "difficulty determination algorithm", which algorithm is capable of determining the difficulty level comprising the more than one difficulty characteristics of a musical piece automatically.

At 110, the specific features that describe the individual events (notes and chords in their musical context) that make up the musical piece are extracted. For example, the features describing a chord may e.g. include its temporal distance from nearest other event, the number of simultaneous notes in the chord, and other musical and instrument-specific attributes that contribute to the difficulty of playing the note or chord.

In addition, in an embodiment, features describing the song as a whole, for example the length of the song in seconds, the average number of notes per second, and other more musical features and more complex statistics are extracted.

At 111, the difficulty level, comprising for example more than one difficulty characteristic is determined.

The overall difficulty of the song is calculated by using a difficulty determination algorithm using the features extracted at 110. For example, in an example embodiment, a simple mathematical formula that only takes into account the "speed" of music (the rate at which notes should be played) would be as follows. Difficulty $D=(1/N)\ \Sigma n\ (1/T(n))$, where N is the total number of notes in the song, T(n) is the temporal distance between note n and the note preceding it. Difficulty in that case is defined as the average of 1/T(n) calculated over the notes comprising the song, where 1/T(n) is the inverse of T(n): short distances T(n) between notes leading to large 1/T(n). More complex difficulty formulas involving more features can be used to achieve more accurate difficulty estimates. Such formulas can be found by using machine learning algorithms that try to minimize the error between manually annotated difficulties and the estimated difficulties given by the mathematical formula being sought. The algorithms require training data: songs for which the difficulties have been annotated manually. Further, in an embodiment, similar approach is applied to the different difficulty characteristics.

In an embodiment, for accuracy any of the difficulty characteristic values as well as the skill level values discussed hereinafter may be given in the form of reported error margin e.g. "the difficulty characteristic value of a song S is 9.2±1.1" or "based on the information thus far, the skill characteristic value of user U is ≥5.3".

In an embodiment, in addition to or instead of the estimation by the algorithm, user feedback may also be used in assessing song difficulty. For example, used feedback may be facilitated by allowing users to assess a song's difficulty e.g. by stating whether they think the song is more or less difficult than estimated. In a further embodiment, the system uses historic user performance information to improve the difficulty level estimation.

At 103, the difficulty level 112 of the musical piece performed by the user is checked. Subsequently, at 104, the user skill level is determined. In an embodiment the user skill level comprises a single scalar value.

The skill characteristic values of a user are in an embodiment defined by the corresponding difficulty characteristic values of a musical piece that the user is able to perform. For example, if one of user's skill characteristic values is 10, she can play songs with corresponding difficulty characteristic value of up to 10 by merely familiarizing herself with the song in question and minimal practice, whereas songs with the corresponding difficulty characteristic value of >10 would require considerably more practice.

In an embodiment, the user skill level comprises more than one skill characteristic value (for example "4, 3, 7") that represent the skill of the user from the viewpoint of different areas of musical skill (for example: melodic skill 4, rhythmic skill 3, motoric skill 7). The skill level of a user may be at least partially defined by the difficulty profile of the songs she can perform. For example, the user may be motorically skilled, but lack rhythmic skills, and therefore the respective characteristic values of the skill level would be different. As a consequence, the user would be able to play songs that require high motoric skill, but is likely to make mistakes in rhythmically difficult sections.

In an example embodiment, the skill level of the user is determined using data of the user performance at 101 analyzed at 102 as follows: if the user was able to perform the musical piece at 101 with a particular difficulty characteristic value of N (e.g. making only few mistakes even when performing them for the first time) defined at 112, the corresponding skill characteristic value of the user is determined to be ≥N. Similarly, if the user fails (makes many mistakes) when performing the musical piece with a particular difficulty characteristic value of N, that corresponding skill characteristic of the user is determined to be <N.

In a further example embodiment, the skill level of the user is determined using in addition or instead stored data of past user performance 105 as follows: if the user is able to consistently perform songs with a particular difficulty characteristic value of N, e.g. making only few mistakes even when performing them for the first time, the corresponding skill characteristic value of the user is determined to be EN. Similarly, if the user then consistently fails (makes many mistakes) when performing songs with another difficulty characteristic value of M, that corresponding skill characteristic value of the user is determined to be <M.

Accordingly, the song difficulty level may be used to determine user's skill characteristic values. For example, if the user is able to consistently perform well, with only few mistakes, songs where e.g. the "rhythmic difficulty characteristic" value of the song is 7, the "rhythmic skill characteristic" of the user's skill level can be estimated to be ≥7.

In an embodiment, to be able to determine the user's skills at 104, the system continuously estimates user skill level for various kinds of musical material performed at 101. For skill estimation, the system in an embodiment uses the user's playing, or singing, as input by, e.g., capturing an acoustic signal or receiving MIDI events. These inputs are then analyzed for notes played correctly or incorrectly, for timing, and for other features that can be used in determining the user's skill level comprising more than one skill characteristic value. In an example embodiment, the ability to play a certain chord can form an independent skill characteristic value. In a further example embodiment, the skill characteristic values are either more complex and abstract, e.g. playing melodies, or dependent on other skills. For example learning a chord is assumed to have interactions with learning other chords.

In an embodiment, in simple cases, the skill estimation model is based on straightforward playing statistics, from single or multiple users, of correctly played instances of independent skill characteristic values like chords. In a further embodiment, in more sophisticated applications, more complicated predictive modeling is applied via state-based methods such as Bayesian inference or Kalman filtering, or time-series prediction via a data-trained probabilistic model. The common idea of the methods used in various embodiments is to produce an up-to-date estimate for success of a single musical event, or a bigger unit, of a given skill dimension.

At 106, the user skill level has been determined. The user skill level determined at 106 is then used as an input parameter in some further steps of the method according to the invention and the analysis of a user performance is carried out in the manner described with reference to step 102 at further embodiments.

Determining the skill level of a user and constantly updating the skill level is straightforward in situation in which the user uses the system regularly and new performance data is accordingly regularly available. The situation is more complicated in cases of new users and returning users.

Returning users, i.e. users who have not used the system for a while, are not atypical in learning music. Learning music is often periodic, sporadic and casual, even spur-of-the-moment, compared to learning other types of skills. Furthermore, in case of returning users, it is not known whether the user has kept on practicing during the absence from using the system or whether they have paused practicing. Hence, the previous determined user skill might be too low, if the user has been practicing, or too high as the skills of some users tend to deteriorate during a pause. The method according to the invention needs to be able to adapt to the needs of returning and new users as well. In an embodiment, the user skill determination is accelerated in case of new and returning users, so that the determined skill level is updated more quickly, that is the algorithm used for the determination is configured to make larger changes to the user skill level, or certain skill characteristic values of the user skill level in order to reach an accurate estimate of the present skill level more quickly.

Figure 2:
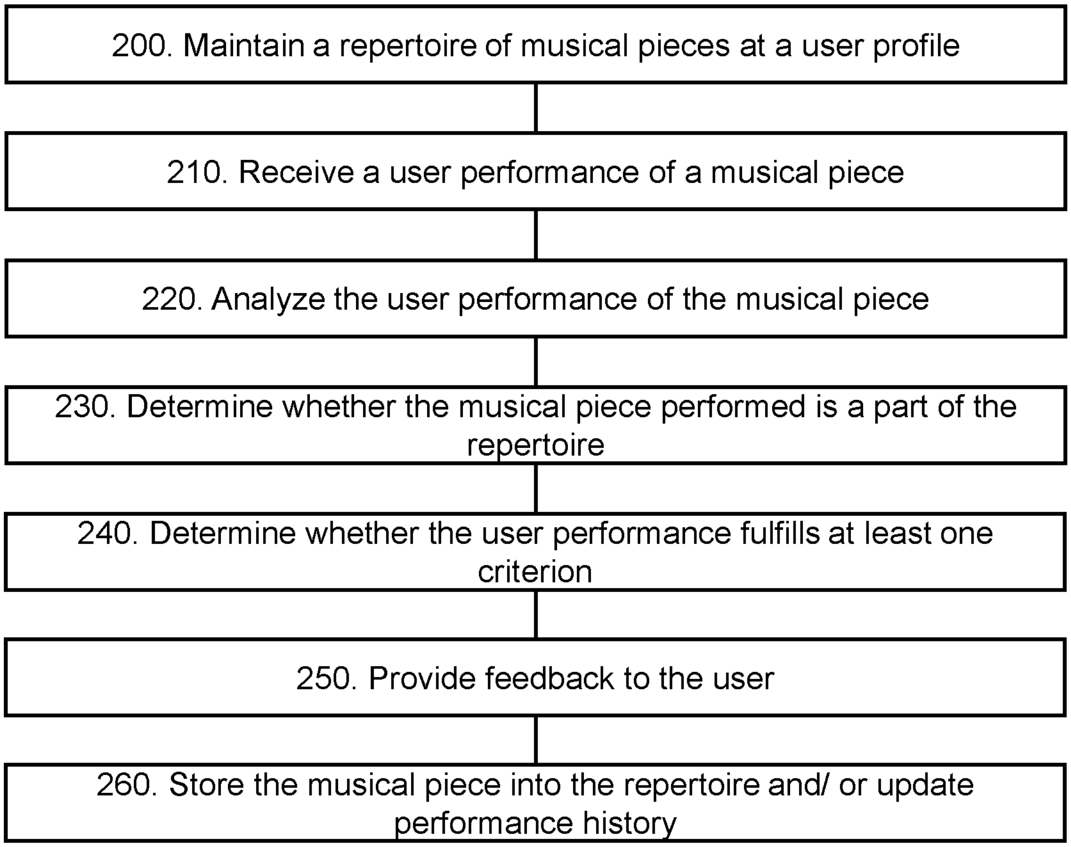
FIG. 2 shows a flow chart of a method according to an example embodiment.

FIG. 2 shows a flow chart of a method according to an example embodiment. At 200 a repertoire of musical pieces at a user profile is maintained. The repertoire, as the term as such entails, comprises a collection of musical pieces that the user is already familiar with and can perform fluently. In an embodiment, the repertoire comprises a simple list of musical pieces, wherein the musical pieces include songs, song versions, riffs, melodies, scales and/or trainers.

In a further embodiment, the repertoire comprises further information on each musical piece, for example the number of times the user has performed the musical piece and at what level, how long the user has been able to perform the musical piece, how much time has elapsed since the last performance of the musical piece and/or how many different versions of the musical piece the user has performed. Maintaining the repertoire comprises in an embodiment updating the repertoire, as will be described hereinafter in more detail, i.e. the repertoire is not merely a static list of past achievements.

At 210, a user performance of a musical piece is received. In an embodiment, the user performance is received in real time as the user performs the musical piece. In a further embodiment, the user performance of a musical piece is recorded and then received after the performance has been completed.

At 220, the user performance of the musical piece is analyzed. In an embodiment, the analysis is carried out in a manner similar to that described hereinbefore with reference to FIG. 1B.

At 230, in an embodiment, it is determined whether the musical piece performed is prior to receiving the user performance a part of the repertoire, that is whether the user has already previously performed the musical piece at such a level of fluency that it has been included in the repertoire of the user. In an embodiment, it is already known whether this is the case, as the user has selected the musical piece to be performed based on a recommendation recommending a musical piece that has not been previously performed by the user for example.

At 240, it is determined based on the analysis of the user performance whether the user performance fulfills at least one predetermined criterion, i.e. whether the user has performed the musical piece at a predetermined level of fluency required. In an embodiment, the at least one predetermined criterion comprises an overall score of the user performance. Such an overall score can be calculated for example based on notes and chords performed correctly and the user's timing.

In a further embodiment, the at least one criterion comprises several criteria that need to be fulfilled, such criteria could reflect different musical characteristics of the musical piece in manner similar to skill characteristic values of the user skill level described hereinbefore with reference to FIG. 1B.

In a further embodiment, the criteria are selected depending on the type of the musical piece. For example, for a chords-based guitar song, the individual criteria could be the user's accuracy on each of the different chords in the song, overall chord accuracy, timing accuracy, whether the user played the whole song or not, and the tempo the user played the song in.

In a still further embodiment, the several criteria comprise an overall score for separate sections of the musical piece and/or separate criteria for separate sections of the musical piece.

In a still further embodiment, determining whether the user performance of the musical piece fulfills at least one predetermined criterion comprises in addition to or instead of an automatic determination, a human determination. In an embodiment the human determination comprises a determination by a human teacher, a determination by the user and/or a determination by other users.

At 250, in an embodiment, feedback is provided to the user based on analyzing the performance of the musical piece. In an embodiment, this post-play feedback is configured to help the user towards performing the musical piece in a way that the at least one predetermined criterion is fulfilled, i.e. the feedback is configured to guide the user towards being able to add the musical piece to the repertoire. In a further embodiment, in addition to the analysis of the user performance at hand, past performance data of the user is also taken into account in providing feedback to the user. For example, the feedback can include information on long term improvement of a certain aspect of user's skills.

At 260, based on the user performance of the musical piece fulfilling the at least one predetermined criterion the musical piece is stored into the repertoire, i.e. it has been determined that the user is able to perform said musical piece at a required level of fluency. Such a determination of the musical piece being added to the repertoire is a rewarding and motivating occasion or the user, a repertoire moment, and accordingly in an embodiment, the adding of the musical piece to the repertoire is presented, or communicated, to the user, for example graphically, with a text or audiovisually. Furthermore, in an embodiment, the user's performance history of the musical piece is updated at 260 whether or not the performance has fulfilled the at least one predetermined criterion.

Figure 3:
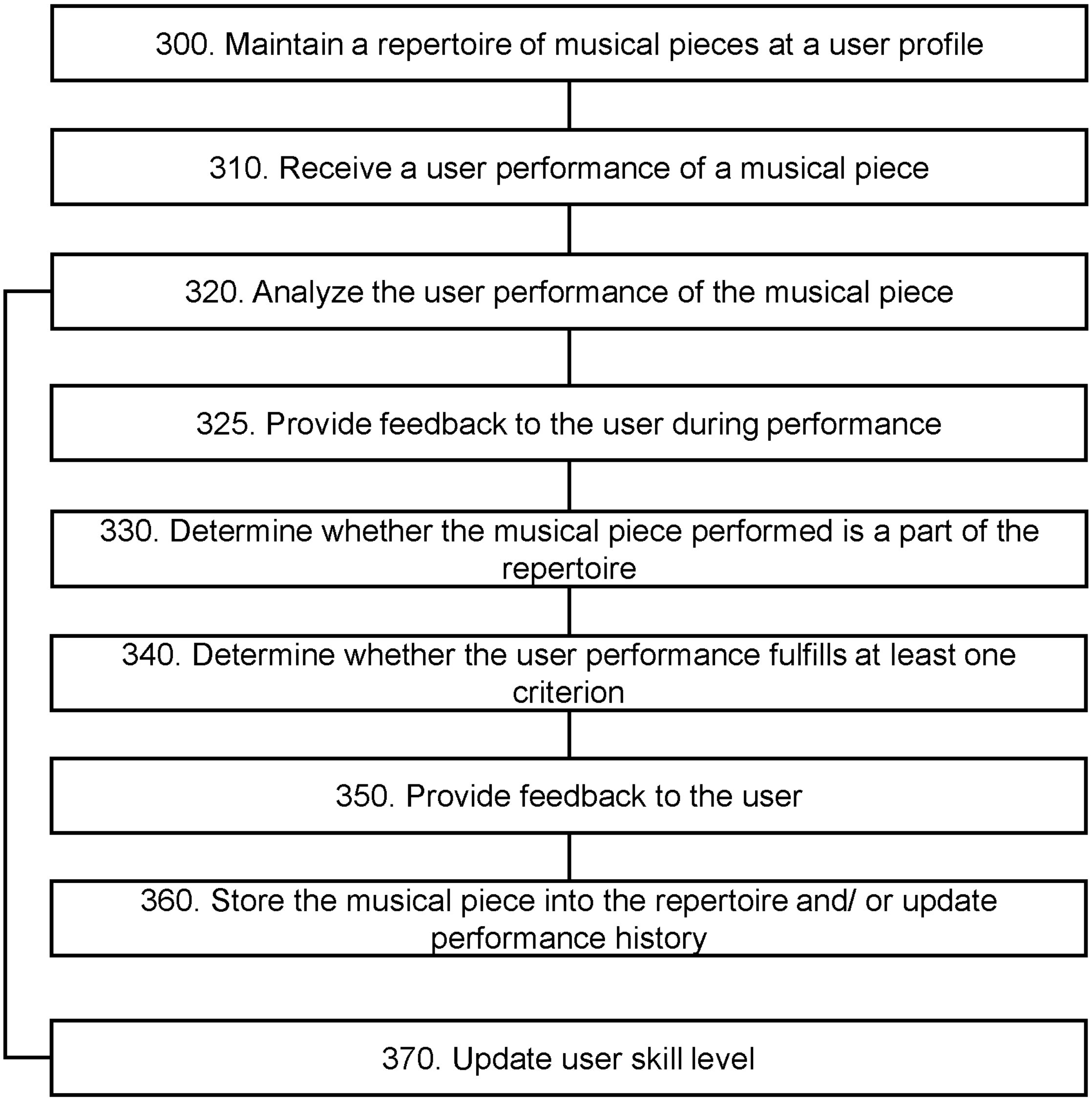
FIG. 3 shows a flow chart of a method according to an example embodiment.

FIG. 3 shows a flow chart of a method according to an example embodiment. Steps 300-320 and 330-360 correspond to the method steps 200-220 and 230-260 described hereinbefore with reference to FIG. 2.

At 325, feedback is provided for the user during the performance of the musical piece. In an embodiment, such live-feedback comprises subtle notifications to the user, for example a small dot in the musical notation on the spot where the user made a mistake. In such a case, the post-play feedback provided at 350 could then include a more elaborate explanation of the mistakes noted in the live-feedback. In a further example embodiment, the live feedback comprises more intrusive feedback, such as stopping the user in the middle of the performance.

At 370, the user skill level is updated based on the analysis of the performance of the musical piece carried out at 320. Updating the user skill level is in an embodiment carried out as described hereinbefore with reference to FIG. 1B.

Figure 4:
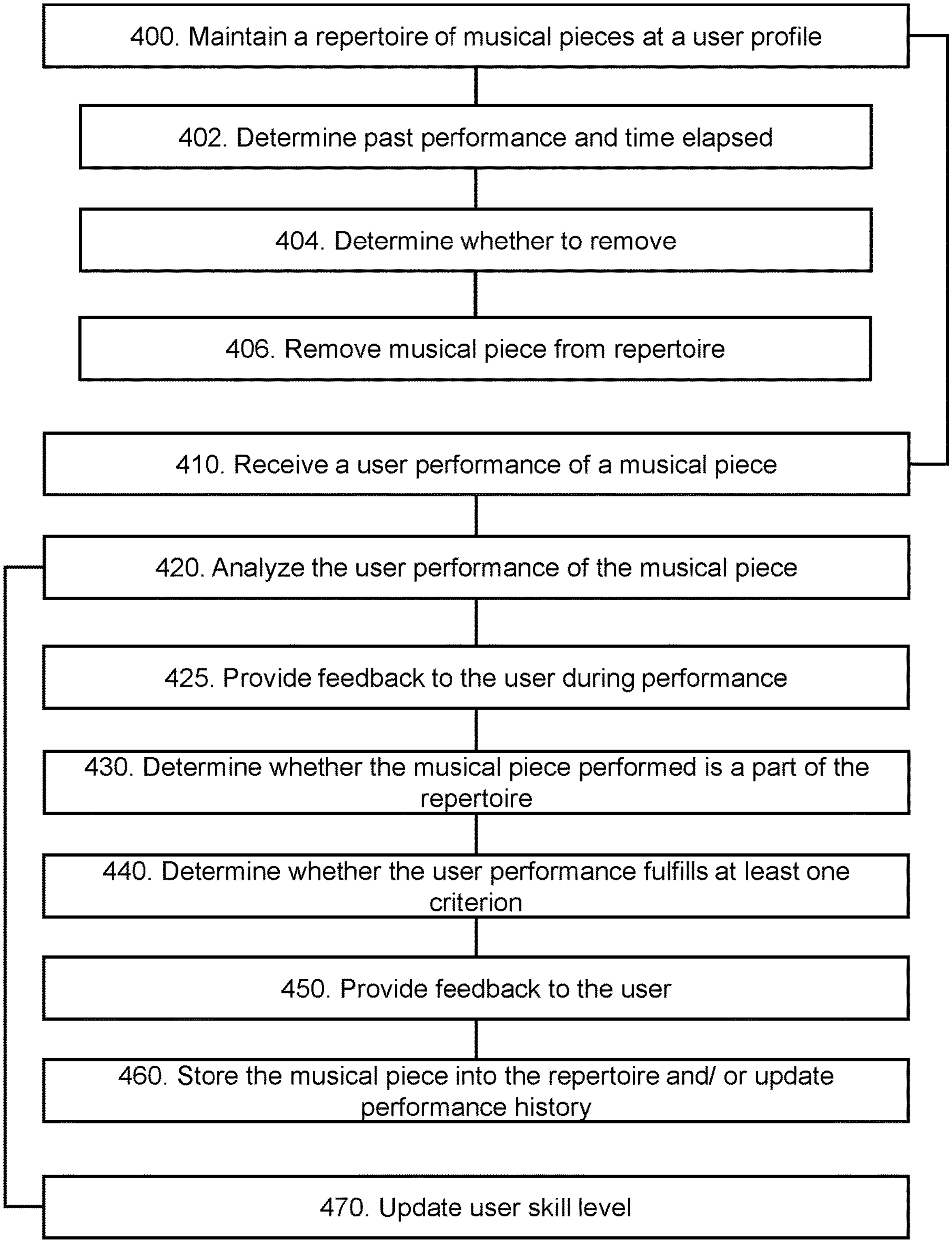
FIG. 4 shows a flow chart of a method according to an example embodiment.

FIG. 4 shows a flow chart of a method according to an example embodiment. Steps 400 and 410-470 correspond to the method steps 300, and 310-370 described hereinbefore with reference to FIGS. 2 and 3. Furthermore, it is noted that the additional steps described with reference to FIG. 4 are applicable in the embodiment of FIG. 2.

The method shown in FIG. 4 further defines the maintaining of the repertoire of musical pieces at 400.

At 402, for each musical piece in the repertoire certain parameters are determined. In an embodiment, such parameters comprise the number of times the user has performed the musical piece and how much time has elapsed since the last performance of the musical piece. In a further embodiment the parameters comprise number of times the user has performed the musical piece and at what level, how long the user has been able to perform the musical piece, how much time has elapsed since the last performance of the musical piece and/or how many different versions of the musical piece the user has performed.

At 404, a determination is made, based on the parameters of each musical piece in the repertoire, for example based on the number of times the user has performed the musical piece and how much time has elapsed since the last performance of the musical piece, whether the musical piece should be removed from the repertoire. In an embodiment, the determination is based simply on the time elapsed from the latest performance, i.e. a musical piece is removed from the repertoire if the user has not performed it for a certain predetermined time. Such a time-based determination may in an embodiment follow the Ebbinghaus Curve of Forgetting as there is no data on new performances of the musical piece during the forgetting period.

As fading of skills and musical pieces previously mastered from the memory of the user is not only dependent on the time elapsed, the determination whether to remove a musical piece from the repertoire is in a further embodiment dependent on further factors as well, for example on the number of times the user has previously performed the musical piece, in particular at the predetermined level of fluency, as relearning the musical piece makes it fade more slowly from the memory of the user.

In a still further embodiment, if the user has for example performed a more difficult version of the musical piece at predetermined level of fluency and/or often, it may be determined that a simpler version of the same musical piece is not at risk of being removed from the repertoire at all anymore.

In a still further embodiment, the determination either to remove a musical piece from the repertoire is based also on the skill level of the user. For example, if the user constantly performs musical pieces that require the same or higher skills than the musical piece in the repertoire, it may be determined that the musical piece is not to be removed from the repertoire even if the user has not performed said musical piece for a long time. Then again, if user performances show that the skills required by a musical piece in the repertoire are deteriorating, removal of the musical piece from the repertoire may happen faster.

At 406, a musical piece is removed from the repertoire based on the determination at 404. In an embodiment, the removal of the musical piece from the repertoire is presented, or communicated, to the user for example graphically, with a text or audiovisually. In a further embodiment, the musical piece is not completely removed, but transferred to a different part of the repertoire, i.e. the repertoire in an embodiment comprises not a single list of musical pieces but also contains subfolders or categories. In such an embodiment, a musical piece determined to be removed may be transferred to a subfolder or category, for example named "soon to be removed" or "fading".

Figure 5:
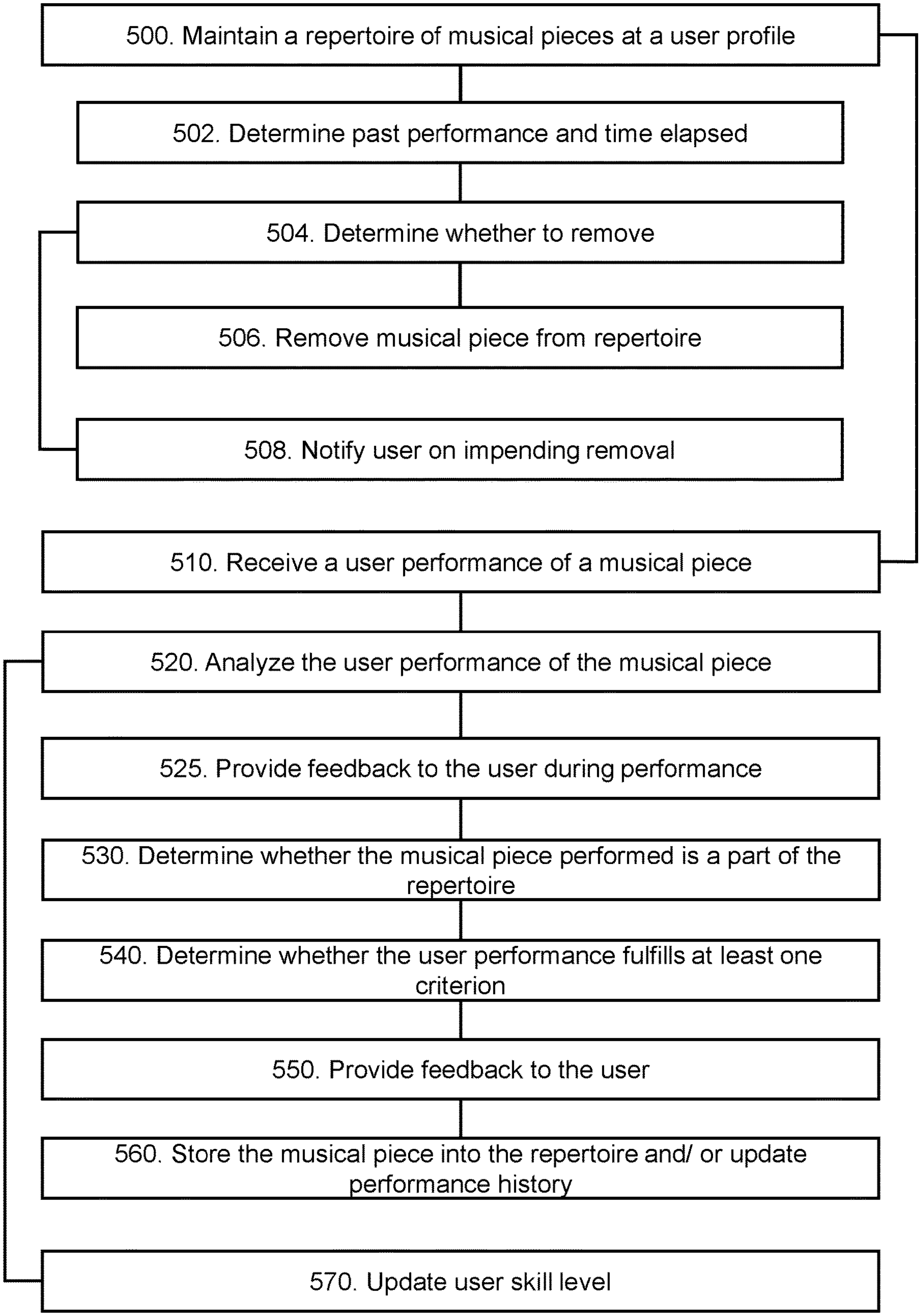
FIG. 5 shows a flow chart of a method according to an example embodiment.

FIG. 5 shows a flow chart of a method according to an example embodiment. Steps 500-506 and 510-570 correspond to the method steps 400-406 and 410-470 described hereinbefore with reference to FIGS. 2 to 4. Furthermore, it is noted that the additional steps described with reference to FIG. 5 are applicable in the embodiment of FIG. 2.

At 508, the user is notified of impending removal of a musical piece from the repertoire based on the determination carried out at 504. Such a notification is configured to encourage the user to perform said musical piece again thus ensuring that it stays in the repertoire. Accordingly, the notification may comprise a direct suggestion to perform said musical piece. In an embodiment, impending removal means that the musical piece is due for immediate removal or that the musical piece would be removed in the near future. In an embodiment, the notification of impending removal is presented, or communicated, to the user for example graphically, with a text or audiovisually. In an embodiment, the notifications are provided less often for musical pieces that are also determined to be harder to remove as explained hereinbefore with reference to step 404.

Figure 6:
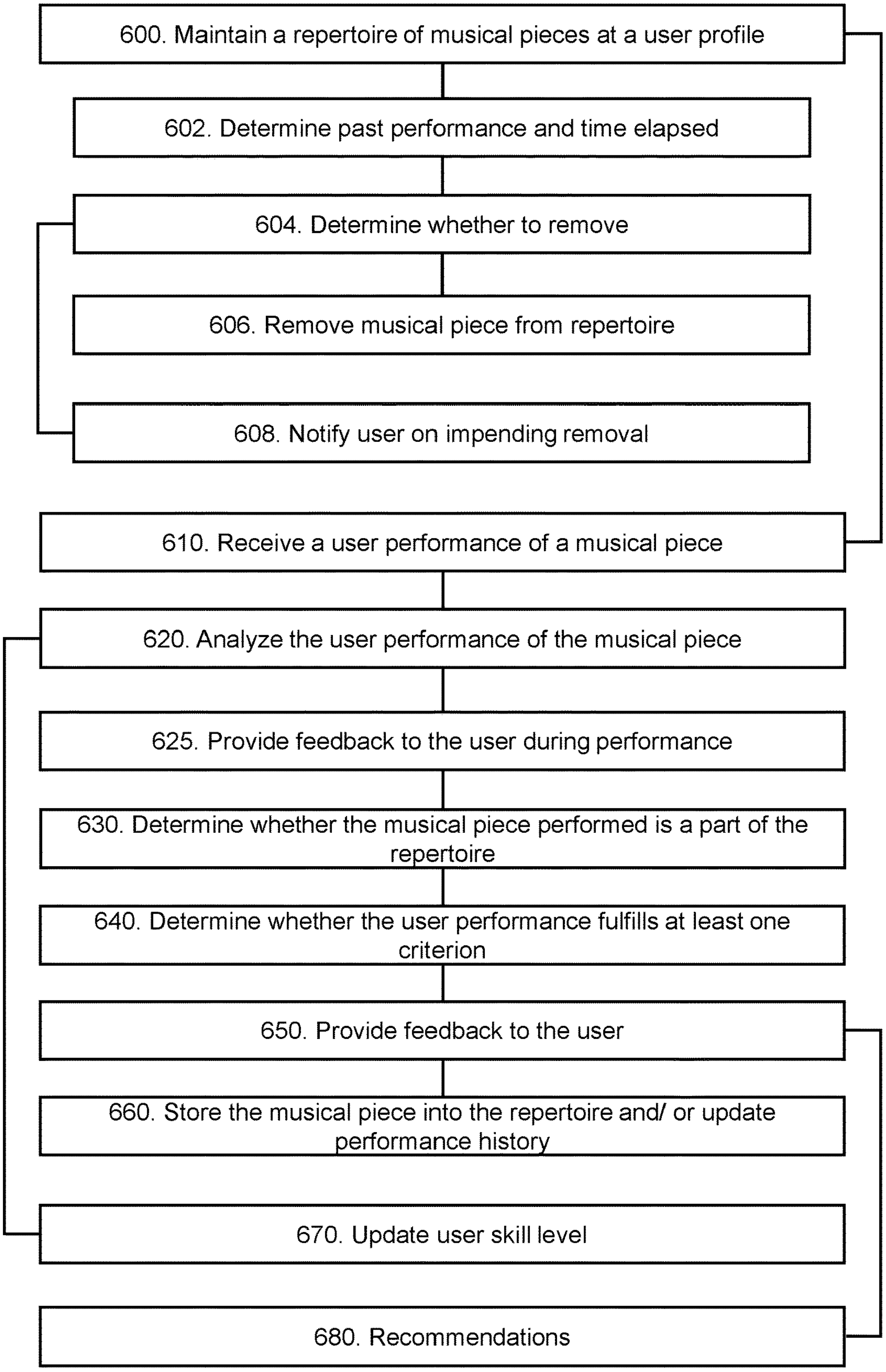
FIG. 6 shows a flow chart of a method according to an example embodiment.

FIG. 6 shows a flow chart of a method according to an example embodiment. Steps 600-670 correspond to the method steps 500-570 described hereinbefore with reference to FIGS. 2 to 5. Furthermore, it is noted that the additional steps described with reference to FIG. 6 are applicable in the embodiment of FIG. 2.

At 680, recommendations are provided for the user as a part of the feedback provided at step 650. In an embodiment, such recommendations comprise further musical pieces for the user to perform, for example in a situation in which the user constantly performs musical pieces and does not reach the level of fluency required for the musical piece to be stored into the repertoire. Recommendations of further musical pieces might in such a situation include easier musical pieces that would work as steppingstones towards mastering the musical piece at which the user has not performed with required fluency. In a further embodiment, the recommendations comprise a suggestion to contact a human teacher, and/or suggestions on various trainers or instructions.

In a still further embodiment, the recommendations comprise musical pieces not directly related to the performance of the user, for example recommendations of musical pieces which incur additional fees or which are a part of an ongoing campaign.

Any of the afore described methods, method steps, or combinations thereof, may be controlled or performed using hardware; software; firmware; or any combination thereof. The software and/or hardware may be local; distributed; centralized; virtualized; or any combination thereof. In an embodiment, any of the afore described methods, method steps, or combinations thereof, may be controlled or performed using a remote server and/or a cloud-based service. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Figure 7:
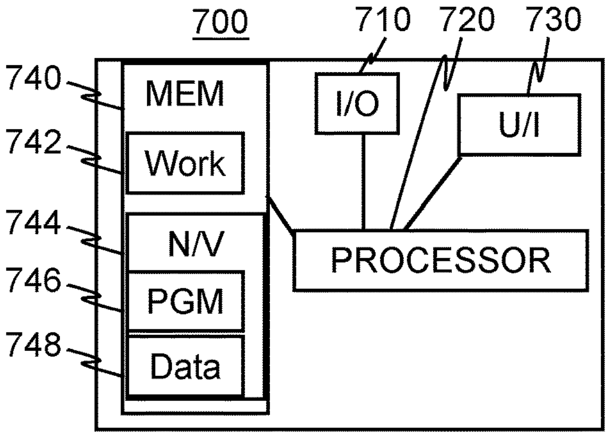
FIG. 7 shows a schematic block diagram of a generalized form of an apparatus according to an example embodiment.

FIG. 7 shows a schematic block diagram of a generalized form of an apparatus according to an example embodiment with which the methods according to embodiments of the invention are implemented. The apparatus 700 in an embodiment is a smartphone or a tablet computer, with a structure known from these. There are also various other devices that can be used to implement the apparatus 700. The apparatus 700 comprises a communication interface 710; a processor 720; a user interface 730; and a memory 740.

The communication interface 710 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 700 or provided as a part of an adapter, card or the like, that is attachable to the apparatus 700. The communication interface 710 may support one or more different communication technologies. The apparatus 700 may also or alternatively comprise more than one of the communication interfaces 710.

In this document, a processor may refer to a central processing unit (CPU); a microprocessor; a digital signal processor (DSP); a graphics processing unit; an application specific integrated circuit (ASIC); a field programmable gate array; a microcontroller; or a combination of such elements.

The user interface may comprise a circuitry for receiving input from a user of the apparatus 700, e.g., via a keyboard; graphical user interface shown on the display of the apparatus 700; speech recognition circuitry; or an accessory device; such as a headset; and for providing output to the user via, e.g., a graphical user interface or a loudspeaker.

The memory 740 comprises a work memory 742 and a persistent memory 744 configured to store computer program code 747 and data 748. The memory 740 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid-state drive (SSD); or the like. The apparatus 700 may comprise a plurality of the memories 740. The memory 740 may be constructed as a part of the apparatus 700 or as an attachment to be inserted into a slot; port; or the like of the apparatus 700 by a user or by another person or by a robot. The memory 740 may serve the sole purpose of storing data, or be constructed as a part of an apparatus 700 serving other purposes, such as processing data.

A skilled person appreciates that in addition to the elements shown in FIG. 7, the apparatus 700 may comprise other elements, such as microphones; displays; as well as additional circuitry such as input/output (I/O) circuitry; memory chips; application-specific integrated circuits (ASIC); processing circuitry for specific purposes such as source coding/decoding circuitry; channel coding/decoding circuitry; ciphering/deciphering circuitry; and the like. Additionally, the apparatus 700 may comprise a disposable or rechargeable battery (not shown) for powering the apparatus 700 if external power supply is not available.

Figure 8:
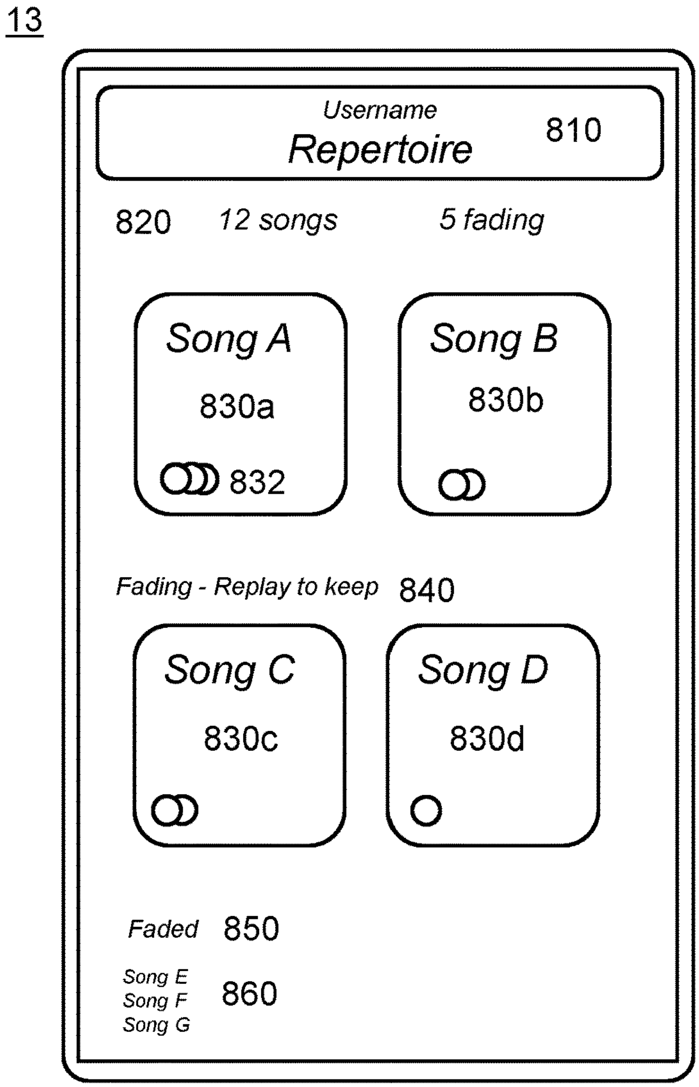
FIG. 8 shows an example view of user representation of the repertoire according to an example embodiment.

FIG. 8 shows an example view of a user representation of the repertoire according to an example embodiment. FIG. 8 shows an example view of the user interface, such as a touch screen, of an apparatus 13 representing the repertoire to the user. The top of the screen shows in an embodiment a title block 810, comprising for example additional info, such as the username of the user. Below the title block 810, in an embodiment, an information banner 820 is provided. In an embodiment, the information banner 820 comprises a summary of the contents of the repertoire, such as the number of musical pieces and the number of musical pieces in danger of being removed from the repertoire.

The representation of the repertoire comprises musical piece icons 830*a-d*. In an embodiment, the musical piece icons comprise a name of the musical piece and for example a graphical representation of the band. In a further embodiment, the musical piece icons 830*a-d* comprise information markers 832 showing for example the number of times the user has performed the musical piece at the required level of fluency for being included into the repertoire.

In an embodiment, the repertoire is divided into subcategories, or subfolders, and the musical piece icons 830*a-d* are placed at a certain subcategory depending on their status. In an embodiment, the representation of the repertoire comprises subtitle blocks 840,850 comprising the name of the category and, in a further embodiment, information for the user such as a suggestion to perform the musical pieces that are in danger of being removed, or fading, from the repertoire.

In an embodiment, the musical pieces previously removed, or faded, from the repertoire are also presented to the user, for example as a simple list of musical piece names.

Without in any way limiting the scope of the appended claims, some technical effects of the example embodiments of the invention are explained in the following.

The method and apparatus according to example embodiments of the invention shown in FIGS. 1A-8 is configured to provide for an enhanced user experience. The method according to example embodiments of the invention is further configured to provide the user with an easy way of keeping track of the progress being made. Furthermore, according to example embodiments of the invention, the use of the system is increased by providing rewarding and motivating moments.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method in an apparatus, the method comprising maintaining a repertoire of musical pieces at a user profile within at least one memory of the apparatus;

receiving a user performance of a musical piece at a communication interface of the apparatus;

the at least one memory and a processor of the apparatus collectively:

analyzing the user performance of the musical piece;

determining based on analyzing the performance whether the user performance of the musical piece fulfills at least one predetermined criterion; and based on the user performance of the musical piece fulfilling the at least one predetermined criterion, storing the musical piece into the repertoire within the at least one memory of the apparatus, and presenting to the user, on a display of the apparatus, an indication that the musical piece has been added to the repertoire, wherein maintaining the repertoire of musical pieces at the user profile further comprises determining for each musical piece in the repertoire a number of past performances and/or a time elapsed from the last performance;

determining whether the musical piece should be removed from the repertoire based on the number of past performances and/or the time elapsed from the last performance; and removing the musical piece from the repertoire based on the determination whether the musical piece should be removed from the repertoire.

2. The method of claim 1, further comprising determining whether the musical piece performed is a part of the repertoire prior to receiving the user performance.

3. The method of claim 2, further comprising providing feedback to the user based on analyzing the performance of the musical piece and/or based on fulfilling the at least one predetermined criterion.

4. The method of claim 2, further comprising based on the user performance of the musical piece updating performance history of the musical piece.

5. The method of claim 2, further comprising updating user skill level comprising skill characteristic values based on analyzing the user performance.

6. The method of claim 1, further comprising providing feedback to the user based on analyzing the performance of the musical piece and/or based on fulfilling the at least one predetermined criterion.

7. The method of claim 6, wherein providing feedback to the user based on analyzing the performance of the musical piece comprises recommending a further musical piece to the user and/or recommending a connection to a human teacher.

8. The method of claim 6, further comprising based on the user performance of the musical piece updating performance history of the musical piece.

9. The method of claim 1, further comprising based on the user performance of the musical piece updating a performance history of the musical piece.

10. The method of claim 1, further comprising updating a user skill level comprising skill characteristic values based on the analyzing of the user performance.

11. The method of claim 10, wherein the at least one predetermined criterion comprises a set of criteria comprising performance characteristic values corresponding to the skill characteristic values.

12. The method of claim 1, further comprising providing feedback to the user while analyzing the user performance.

13. The method of claim 1, further comprising presenting a notification to the user on a musical piece being in danger of being removed from the repertoire based on the time elapsed from the last performance.

14. The method of claim 1, wherein determining whether the musical piece should be removed from the repertoire based on the number of past performances and/or the time elapsed from the last performance comprises determining that the musical piece will remain in the repertoire permanently if it fulfills a predetermined condition.

15. The method of claim 1, wherein determining whether the musical piece should be removed from the repertoire based on the number of past performances and/or the time elapsed from the last performance comprises checking whether the musical piece has previously been in danger of being removed or has been removed from the repertoire.

16. The method of claim 1, wherein determining whether the musical piece should be removed from the repertoire based on the number of past performances and/or the time elapsed from the last performance comprises comparing a user skill level to performance characteristic values of the musical piece.

17. The method of claim 1, wherein determining whether the user performance of the musical piece fulfills at least one predetermined criterion comprises an automatic determination and/or a human determination.

18. An apparatus comprising the at least one memory and processor collectively configured to cause the apparatus to perform the method of claim 1.

19. A non-transitory memory medium comprising a computer program, the computer program comprising computer program code configured to, when executed by an apparatus, to cause the apparatus to perform the method of claim 1.

* * * * *